US012163362B1

(12) United States Patent
Barbaro

(10) Patent No.: US 12,163,362 B1
(45) Date of Patent: Dec. 10, 2024

(54) ADAPTER FOR ATTACHING UTILITARIAN ARTICLES TO A DOOR HINGE

(71) Applicant: Michael Barbaro, Plano, TX (US)

(72) Inventor: Michael Barbaro, Plano, TX (US)

( * ) Notice: Subject to any disclaimer, the term of this patent is extended or adjusted under 35 U.S.C. 154(b) by 53 days.

(21) Appl. No.: 17/873,340

(22) Filed: Jul. 26, 2022

Related U.S. Application Data

(60) Provisional application No. 63/244,017, filed on Sep. 14, 2021.

(51) Int. Cl.
*E05D 11/00* (2006.01)
*A47C 16/02* (2006.01)
*A47G 1/16* (2006.01)
*A47G 25/74* (2006.01)
*A47G 1/00* (2006.01)

(52) U.S. Cl.
CPC .............. *E05D 11/00* (2013.01); *A47C 16/02* (2013.01); *A47G 1/16* (2013.01); *A47G 25/746* (2013.01); *A47G 2001/002* (2013.01)

(58) Field of Classification Search
CPC ... E05D 11/00; A47C 16/02; E05Y 2900/132; A47G 1/16; A47G 25/746; A47G 2001/002; A47G 25/0685
See application file for complete search history.

(56) References Cited

U.S. PATENT DOCUMENTS 496,173 A * 4/1893 Smith ..................... A47F 7/283 211/75
2,509,502 A * 5/1950 Hunt ....................... E05D 11/00 248/213.1
2,595,521 A * 5/1952 Hanson ................... D06F 57/12 248/213.1
2,896,791 A * 7/1959 Raber ................ A47G 25/0621 248/213.1
3,825,127 A * 7/1974 Morrison ................ E05D 11/00 248/289.11
4,721,212 A * 1/1988 Lowe ................ A47G 25/0685 211/119.004
5,505,317 A * 4/1996 Rulis et al.
6,050,427 A * 4/2000 Loveland ................ E05D 11/00 211/119.004
6,712,228 B2 * 3/2004 Lowe
9,990,819 B2 * 6/2018 Ricks ......................... E05D 3/02
10,458,163 B1 * 10/2019 Trump ................ B05B 13/0285
10,465,843 B2 * 11/2019 Mantella
10,890,022 B2 * 1/2021 Frige Filho .............. B60J 5/105
10,946,233 B1 * 3/2021 Neeley, Jr. ......... A63B 21/1663
11,623,582 B2 * 4/2023 Bennett ................. E05D 5/0207 248/213.1
2007/0158957 A1 * 7/2007 Kramer et al.
(Continued)

*Primary Examiner* — Christine M Mills
*Assistant Examiner* — Matthew J Sullivan
(74) *Attorney, Agent, or Firm* — Kenneth L. Tolar

(57) ABSTRACT

An adapter for securing a utilitarian article to a door hinge includes a housing formed of a front panel removably fastened to a rear panel. Positioned between the front and rear panels is a central plate having a distal end and a proximal end. At the distal end of the plate is a flared flange having two or more hinge knuckles thereon that mesh and align with hinge barrels on an existing door and associated frame when the hinge pin is removed. Any one of multiple utilitarian articles, such as a seat, a tie rack or a mirror can be secured to the opposing end of the central plate.

11 Claims, 2 Drawing Sheets

(56) References Cited

U.S. PATENT DOCUMENTS

| | | | | |
|---|---|---|---|---|
| 2007/0272637 | A1* | 11/2007 | Rigas | |
| 2009/0119879 | A1* | 5/2009 | Rigas | E05D 7/1044<br>16/386 |
| 2010/0108834 | A1* | 5/2010 | Rigas | |
| 2019/0352951 | A1* | 11/2019 | Howson | E05D 5/128 |

* cited by examiner

FIG. 6
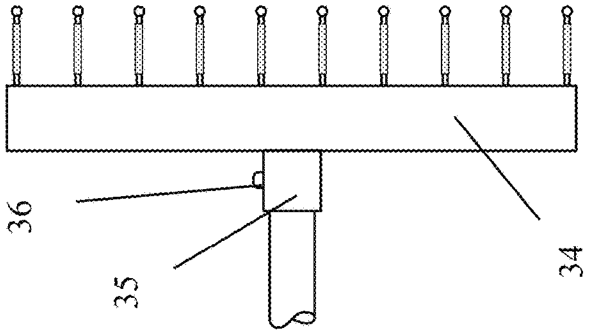
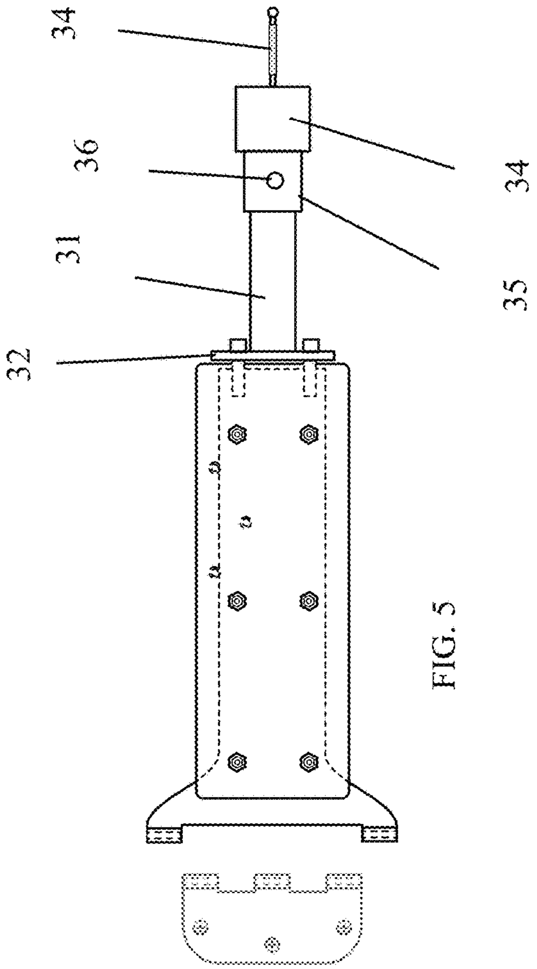
FIG. 5
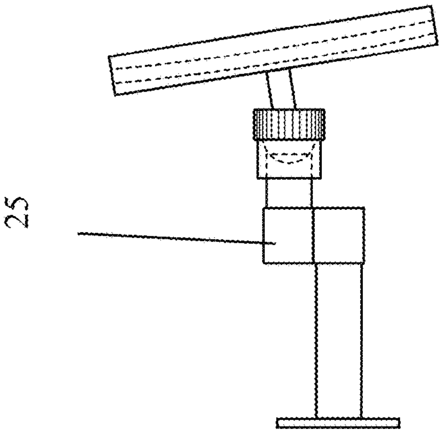
FIG. 8
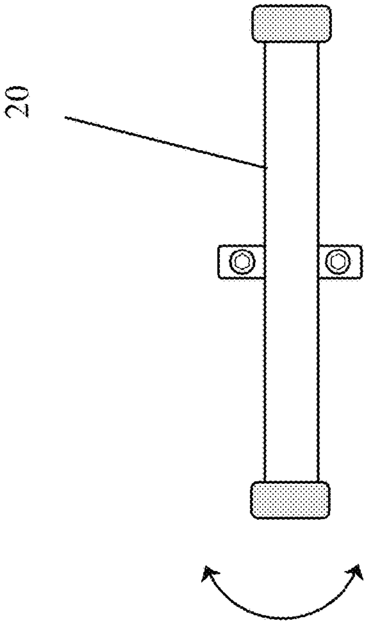
FIG. 7

ADAPTER FOR ATTACHING UTILITARIAN ARTICLES TO A DOOR HINGE

CROSS REFERENCE TO RELATED APPLICATIONS

This application claims priority of provisional application No. 63/244,017 filed on Sep. 14, 2021, the specification of which is incorporated herein by reference.

BACKGROUND OF THE INVENTION

The present invention relates to an adapter for conveniently securing a seat, a tie rack, or similar utilitarian articles to a door hinge.

DESCRIPTION OF THE PRIOR ART

When dressing in a closet, a user typically must rest on a stool or chair when putting on shoes or socks, particularly if elderly or infirm. Because closets are usually small and confined, they will not practically accommodate a chair or stool. Therefore, the user must exit the closet, travel to the nearest room having a chair, bed, or stool, and then reenter the closet if necessary. Repeatedly traveling between a closet and other rooms when dressing is time consuming and aggravating.

Accordingly, there is currently a need for device that allows certain utilitarian articles to be temporarily supported in a closet or another confined space. The present invention addresses this need by providing an adapter that allows a seat, stool, or similar utilitarian article to be quickly and easily secured to a door hinge.

SUMMARY OF THE INVENTION

The present invention relates to an adapter for securing a utilitarian article to a door hinge comprising a housing formed of a front panel removably fastened to a rear panel. Positioned between the front and rear panels is a central plate having a distal end and a proximal end. At the distal end of the plate is a flared flange having two or more hinge knuckles thereon that mesh and align with hinge barrels on an existing door and associated frame when the hinge pin is removed. Any one of multiple utilitarian articles, such as a seat, a tie rack or a mirror can be secured to the opposing end of the central plate.

It is therefore an object of the present invention to provide a uniquely designed adapter that allows a utilitarian article to be quickly attached to a door hinge.

It is therefore another object of the present invention to provide an adapter for a door hinge that eliminates the burdensome and aggravating task of traveling between multiple rooms when dressing.

It is yet another object of the present invention to provide an adapter that allows an indeterminate number of utilitarian articles to be attached to a door hinge.

Other objects, features, and advantages of the present invention will become readily apparent from the following detailed description of the preferred embodiment when considered with the attached drawings and the appended claims.

BRIEF DESCRIPTION OF THE DRAWINGS

FIG. 5 is a front view of the adapter according to the present invention securing a tie rack to a door hinge.

FIG. 6 is an isolated view of the tie rack.

FIG. 7 is an isolated view of the foot bar.

FIG. 8 is an isolated view of the adjustable mirror.

DESCRIPTION OF THE PREFERRED EMBODIMENT

Figure 2:
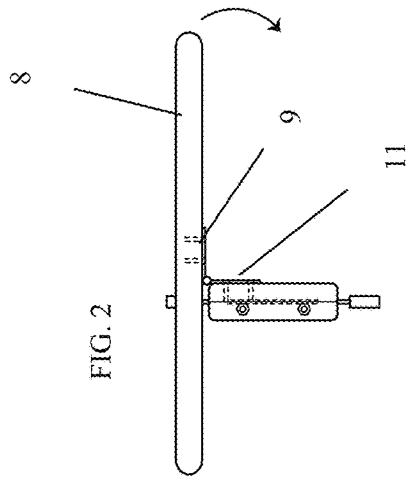
FIG. 2 is a side view of the adapter and seat.

The present invention relates to an adapter for securing a utilitarian article to a door hinge comprising a housing formed of a front panel 1 removably fastened to a rear panel 2. Positioned between the front and rear panels is a central plate 3 having a distal end and a proximal end. At the proximal end of the plate is a flared flange 4 having two or more spaced hinge knuckles 15 thereon that mesh and align with hinge barrels 5 on an existing door and associated door frame 63 when the hinge pin is removed. The distal end includes a plurality of threaded sleeves 6 for attaching any one of a plurality of utilitarian articles described infra. The plate 3 and the rear panel 2 include a first set 14 of multiple apertures that are aligned with barrel nuts 7 on the front panel to allow the housing components to be quickly and securely coupled with bolts or similar fasteners. Preferably, the barrel nuts 7 are pretreated with an adhesive to prevent the fasteners from loosening over time.

Figure 1:
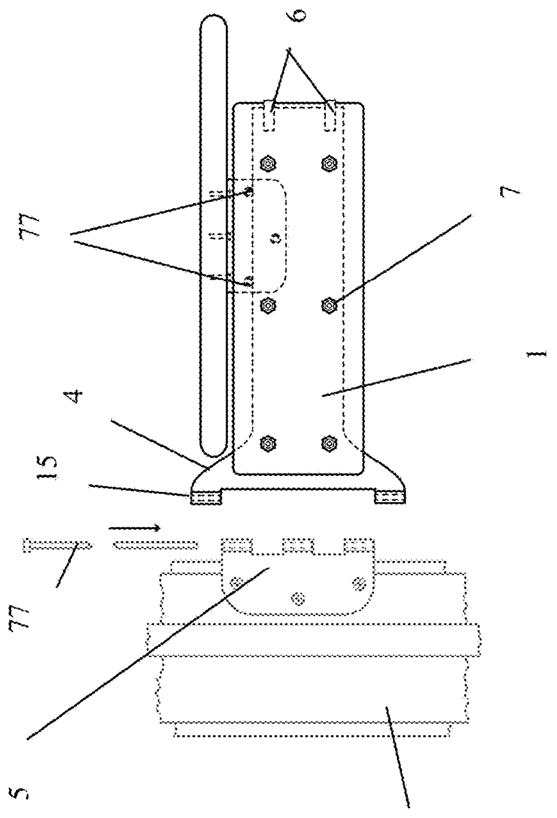
FIG. 1 is a front view of the adapter according to the present invention securing a seat to a door hinge.
Figure 4:
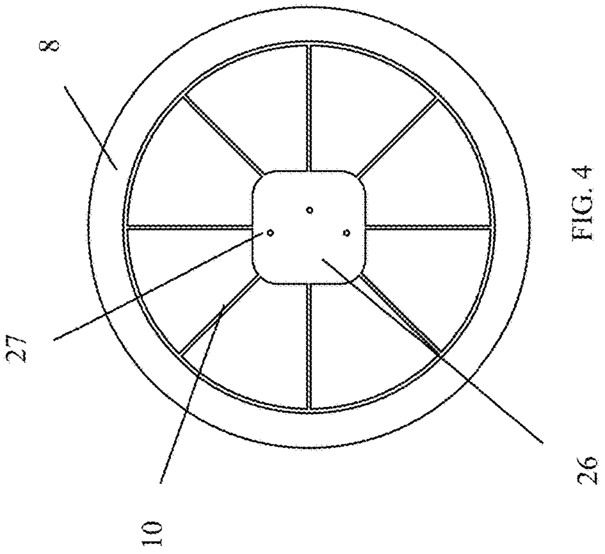
FIG. 4 is an isolated view of the seat.
Figure 3:
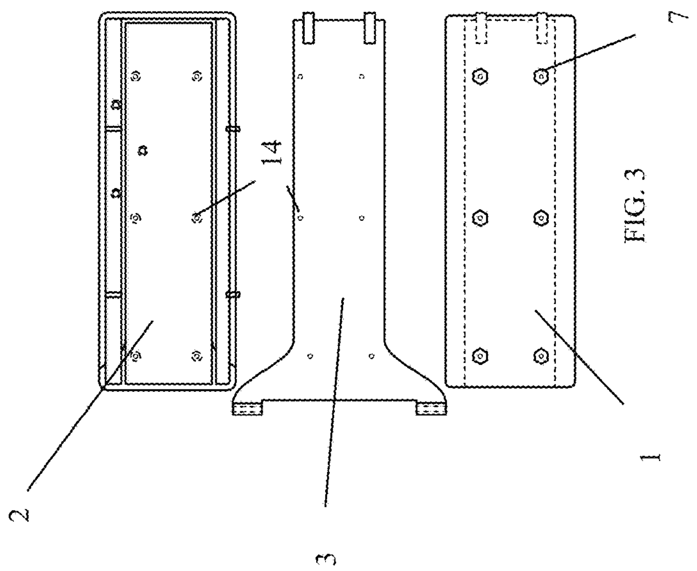
FIG. 3 is a front, exploded view of the housing and central plate.

Now referring to FIGS. 1, 2 and 4, the utilitarian article could be a seat including a circular disc 8 having a first hinge plate 9 attached to a lower surface. A second hinge plate 11 is pivotally coupled with the first hinge plate 9 and is fastened to a second set 77 of apertures on the housing rear panel as depicted in FIGS. 1 and 2. The first hinge plate 9 is offset relative to the disc's central transverse axis so the rear edge of the seat automatically folds downwardly when released to prevent interference with door operation. The disc 8 includes a centrally disposed sheet 26 on a lower surface with threaded bores 27 thereon. Threaded fasteners are inserted through apertures on both the first hinge plate and the bores 27 to fasten the seat to the hinge. Reinforcement ribs 10 radially extend from the sheet to enhance the structural integrity of the disc. The seat could include a weight-activated safety latch that engages when a user sits to prevent collapsing. The safety latch releases when the person's weight is removed, so gravity will cause the seat to automatically fold.

Now referring to FIG. 5, the utilitarian article could be a tie rack 30 including a telescoping support shaft 31 having a mounting plate 32 at a first end. The mounting plate 32 includes holes that receive bolts or similar fasteners for insertion into the threaded sleeves 6 at the proximal end of the housing. At the opposing end of the support post is a header 33 with a plurality of posts 34 extending therefrom for suspending a tie or similar article. The header is coupled with the shaft using a swivel connector 35 having a spring-biased button 36 that, when depressed, allows the header to be rotated between a vertical (FIG. 6) and a horizontal position (FIG. 5).

Now referring to FIGS. 6 and 7, the utilitarian article could be a foot support bar 20 or an adjustable magnifying mirror 25. As with the tie rack, each item includes a mounting plate for receiving fasteners that are coupled with the threaded sleeves 6 at the proximal end of the housing.

To install the adapter, a user pulls the door hinge pin, aligns the central plate knuckles with the door and frame hinge barrels, and reinserts an accompanying pin 77 that is longer and stronger than the existing door hinge pin. The desired utilitarian article is secured to the central plate and can easily be folded or rotated to a vertical position when not in use to minimize interference with door operation.

The above-described device is not limited to the exact details of construction and enumeration of parts provided herein. For example, though the utilitarian article has been primarily depicted and described as a seat, a foot bar, a mirror or a tie rack, the article can be any number of items, such as a belt rack, a hanger rod, a work surface, a makeup table, a makeup mirror, or an extendable seat reinforcement bar. In addition, though the adapter has been primarily depicted and described as attaching to a door hinge, it could attach directly to a steel, universal wall mount for attaching the utilitarian article directly to a wall. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An adapter for securing a utilitarian article to a door hinge comprising: a housing having a proximal end and a distal end;

means for attaching the proximal end of said housing to a door hinge;

a seat;

means for attaching the seat to the distal end of said housing.

2. The adapter according to claim 1 wherein said housing is formed of a front panel removably fastened to a rear panel with a central plate positioned therebetween.

3. The adapter according to claim 1 wherein said means for attaching the proximal end of said housing to a door hinge comprises:

a flange at an end of said plate, said flange having a pair of spaced hinge knuckles at an end thereof, said hinge knuckles meshing and aligning with hinge barrels on an existing door and associated door frame;

a hinge pin received within said hinge knuckles and said hinge barrels.

4. The adapter according to claim 1 wherein said seat includes a disc hingedly attached to said housing.

5. The adapter according to claim 4 wherein said seat is attached to said housing so that a rear edge of the seat automatically folds downwardly when released to prevent interference with door operation.

6. The adapter according to claim 4 wherein said seat includes reinforcement ribs radially extending from a center to enhance the structural integrity of the disc.

7. The adapter according to claim 1 further comprising a tie rack attachable to the distal end of said housing.

8. The adapter according to claim 7 wherein said tie rack includes a telescoping support shaft having a header with a plurality of posts at an end thereof for suspending a tie.

9. The adapter according to claim 8 wherein said header is coupled with the shaft using a swivel connector that allows the header to be rotated between a vertical and a horizontal position.

10. The adapter according to claim 1 further comprising a foot support bar attachable to the distal end of said housing.

11. The adapter according to claim 3 further comprising an adjustable magnifying mirror attachable to the distal end of said housing.

* * * * *